Patented Jan. 7, 1936

2,026,863

UNITED STATES PATENT OFFICE 2,026,863

MERCAPTOBENZOTHIAZYL-ARYLDI-SULPHIDES

Max Bögemann, Cologne-Mulheim, Germany, assignor to I. G. Farbenindustrie Aktiengesellschaft, Frankfort-on-the-Main, Germany, a corporation of Germany No Drawing. Application February 20, 1930, Serial No. 430,103. In Germany February 28, 1929

4 Claims. (Cl. 260—16)

The present invention relates to new condensation products of mercaptobenzothiazoles with aromatic sulphur chlorides or bromides.

In accordance with the invention new condensation products are obtainable by reacting upon a compound of the probable formula

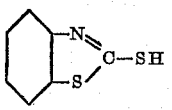

wherein the benzene nucleus may be substituted by halogenatoms, alkyl-, nitro- or alkoxy groups with a compound of the formula Aryl—S—X wherein X means chlorine or bromine and wherein aryl means the residue of a benzene or naphthalene nucleus which may be substituted by halogen atoms, alkyl-, nitro- or alkoxy groups.

The reaction is advantageously performed by causing the components to react upon one another in molecular amounts in the presence of a solvent being inert to the starting materials, such as tetrachlormethane, benzene, toluene, ligroin and the like, and heating the reaction mixture advantageously to boiling until no more hydrochloric-, or hydrobromic acid is evolved. Hereafter the solvent is distilled off and the remainder recrystallized from a suitable organic solvent, such as benzine, ligroin, benzene or the like.

As starting material suitable for performing the reaction there may be mentioned by way of example:

(1) As mercaptobenzothiazoles the compounds of the formula:

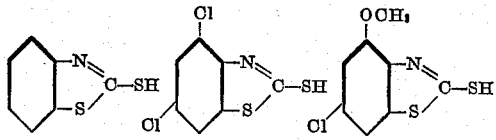

or other compounds of the first formula, which are described by Sebrell and Boord (Journ. Amer. Chem. Soc. 45 (1923), page 2390), or by Teppema and Sebrell (Journ. Amer. Chem. Soc. 49 (1927), page 1748, 1779).

(2.) As compounds of the formula aryl-S-X phenylsulphurchloride, 4-methylphenyl-1-sulphurchloride, 2-nitrophenyl-1-sulphurchloride, 1-chloronaphthyl-2-sulphurchloride, 2-nitrophenyl-1-sulphurbromide and the like.

The products thus obtainable probably correspond to the general formula:

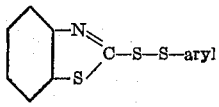

wherein aryl stands for a benzene or naphthalene nucleus and wherein all the aromatic nuclei may be substituted by halogenatoms, methyl-, nitro- or alkoxy groups.

They form yellow crystalline compounds rather easily soluble in the usual organic solvents and are valuable vulcanization accelerators as well for natural rubber as for artificial rubber like masses obtainable, for example, by polymerizing hydrocarbons of the butadiene series according to any desired method.

The following examples illustrate my invention without restricting it thereto.

Example 1

34 g. of dry mercaptobenzothiazole are suspended in 800 ccm. of dry benzene to which suspension a solution of 38 g. of para-nitrophenyl-sulphurchloride in 200 ccm. of benzene is added. The mixture is then heated to boiling until no more hydrochloric acid gas evolves. The benzene is then distilled off and the residue purified by recrystallization from ligroin. The benzothiazyl-para-nitrophenyldisulphide is thus obtained in form of yellow crystals melting at 137–138° C.

Example 2

32 g. of 4-methoxy-6-chloro-mercaptobenzothiazole are suspended in 350 ccm. of benzene. To this suspension a solution of 26 g. of para-nitrophenylsulphurchloride in 150 ccm. of benzene is caused to run in and the mixture is further treated as described in Example 1. The 4-methoxy-6-chloro-benzothiazyl-para-nitrophenyldisulfide thus obtained crystallizes from toluene in yellow crystals, melting at 172–173° C.

Example 3

33 g. of 4,6-dichloro-mercoptabenzothiazole are suspended in 350 ccm. of benzene and to this suspension a solution of 26 g. of para-nitrophenyl-sulphurchloride in 200 ccm. benzene is added. Hereafter the mixture is heated to boiling until no more hydrochloric acid gas evolves. The benzene is distilled off and the residue recrystallized from toluene. Yellow crystals consisting of 4,6-dichloro-benzothiazyl-para-nitrophenyldisulphide are thus obtained melting at 181–182° C.

I claim:—

1. The products of the formula:

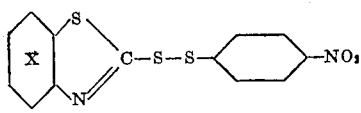

wherein the nucleus marked X may be substituted by halogen atoms, alkyl-, nitro- or alkoxy groups, said products being yellow crystalline compounds, and being valuable accelerators for natural rubber as well as for artificial rubber-like masses.

2. The product of the formula

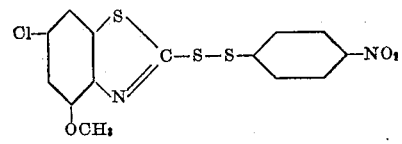

said product crystallizing from ligroin in yellow crystals, melting at 137–138° C., being a valuable vulcanization accelerator as well for natural rubber as for artificial rubber like masses.

3. The product of the formula:

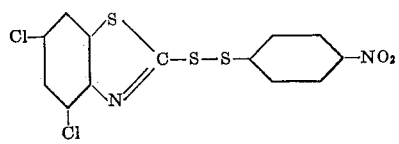

said product crystallizing from toluene in yellow crystals, melting at 172–173° C.

4. The product of the formula:

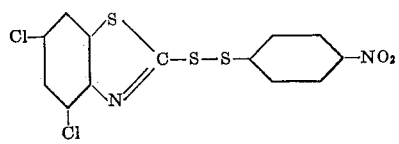

said product crystallizing from toluene in yellow crystals melting at 181 to 182° C.

MAX BÖGEMANN.